United States Patent
Bradley et al.

(10) Patent No.: US 7,246,125 B2
(45) Date of Patent: Jul. 17, 2007

(54) CLUSTERING OF DATABASES HAVING MIXED DATA ATTRIBUTES

(75) Inventors: Paul S. Bradley, Seattle, WA (US); Markus Wawryniuk, Halle (DE)

(73) Assignee: Microsoft Corporation, Redmond, WA (US)

( * ) Notice: Subject to any disclaimer, the term of this patent is extended or adjusted under 35 U.S.C. 154(b) by 28 days.

(21) Appl. No.: 09/886,771

(22) Filed: Jun. 21, 2001

(65) Prior Publication Data

US 2004/0010497 A1    Jan. 15, 2004

(51) Int. Cl.
*G06F 17/30* (2006.01)
*G06F 15/16* (2006.01)

(52) U.S. Cl. .................. 707/100; 707/6; 707/101; 706/46

(58) Field of Classification Search .............. 435/6; 706/46, 52, 45; 707/6, 100, 101
See application file for complete search history.

(56) References Cited

U.S. PATENT DOCUMENTS

| | | | |
|---|---|---|---|
| 5,329,596 A | 7/1994 | Sakou et al. ............. 382/226 |
| 5,832,182 A | 11/1998 | Zhang et al. ............. 706/50 |
| 5,832,482 A | 11/1998 | Yu et al. ................. 707/6 |
| 5,875,285 A | 2/1999 | Chang .................... 706/53 |
| 5,884,305 A | 3/1999 | Kleinberg et al. ......... 707/6 |
| 6,138,117 A * | 10/2000 | Bayardo .................. 707/6 |
| 6,263,337 B1 | 7/2001 | Fayyad et al. ............ 707/6 |
| 6,470,344 B1 * | 10/2002 | Kothuri et al. ........... 707/100 |
| 2002/0049740 A1 * | 4/2002 | Aming et al. ............. 707/1 |
| 2006/0026152 A1 * | 2/2006 | Zeng et al. .............. 707/5 |

* cited by examiner

*Primary Examiner*—Tony "Hassan" Mahmoudi

(57) ABSTRACT

A computer data processing system. A method for clustering data in a database comprising providing a database having a number of data records having both discrete and continuous attributes. Grouping together data records from the database which have specified discrete attribute configurations. Clustering data records having the same or similar specified discrete attribute configuration based on the continuous attributes to produce an intermediate set of data clusters. And, merging together clusters from the intermediate set of data clusters to produce a clustering model.

12 Claims, 3 Drawing Sheets

CLUSTERING OF DATABASES HAVING MIXED DATA ATTRIBUTES

FIELD OF THE INVENTION

The present invention concerns database analysis and more particularly concerns an apparatus and method for clustering of data into groups that capture important regularities and characteristics of the data.

BACKGROUND

Large data sets are now commonly used by many business organizations. In fact, so much data is contained in large database that asking even a simple question about the data has become a challenge. Large data stores can overwhelm users accessing the data with a flood of information. Tapping into large databases for even simple browsing can result in a return of irrelevant and unimportant facts. Even people who do not 'own' large databases face the overload problem when accessing databases on the Internet. A large challenge now facing the database community is how to sift through these databases to find useful information.

Existing database management systems (DBMS) perform the steps of reliably storing data and retrieving the data using a data access language, typically SQL. One major use of database technology is to help individuals and organizations make decisions and generate reports based on the data contained in the database.

An important class of problems in the areas of decision support and reporting are clustering (segmentation) problems where one is interested in finding groupings (clusters) in the data. Data clustering has been used in statistics, pattern recognition, machine learning, and many other fields of science and engineering. However, implementations and applications have historically been limited to small data sets with a small number of dimensions or fields.

Each data cluster includes records that are more similar to members of the same cluster than they are similar to the rest of the data. For example, in a marketing application, a company may want to decide who to target for an ad campaign based on historical data about a set of customers and how they responded to previous campaigns. Employing analysts (statisticians) to build cluster models is expensive, and often not effective for large problems (large data sets with large numbers of fields). Even trained scientists can fail in the quest for reliable clusters when the problem is high-dimensional (i.e. the data has many fields, say more than 20).

Applications of clustering are numerous and include the following broad areas: data mining, data analysis in general, data visualization, sampling, indexing, prediction, and compression. Specific applications in data mining including marketing, fraud detection (in credit cards, banking, and telecommunications), customer retention and churn minimization (in all sorts of services including airlines, telecommunication services, internet services, and web information services in general), direct marketing on the web and live marketing in Electronic Commerce.

Clustering has been formulated in various ways. The fundamental clustering problem is that of grouping together (clustering) data items that are similar to each other. The most general approach to clustering is to view it as a density estimation problem. We assume that in addition to the observed variables for each data item, there is a hidden, unobserved variable indicating the "cluster membership" of the given data item. Hence the data is assumed to arrive from a mixture model and the mixing labels (cluster identifiers) are hidden. In general, a mixture model M having K clusters $C_i$, i=1, ..., K, assigns a probability to a particular data record or point x as follows:

$$Pr(x|M) = \sum_{i=1}^{K} W_i \cdot Pr(x|C_i, M)$$

where $W_i$ are called the mixture weights.

The problem then is estimating the parameters of the individual $C_i$. Usually it is assumed that the number of clusters K is known and the problem is to find the best parameterization of each cluster model. A popular technique for estimating the model parameters (including cluster parameters and mixture weights) is the EM algorithm (see P. Cheeseman and J. Stutz, "Bayesian Classification (AutoClass): Theory and Results", in Advances in Knowledge Discovery and Data Mining, Fayyad, U., G. Piatetsky-Shapiro, P. Smyth, and R. Uthurusamy(Eds.), pp. 153-180. MIT Press, 1996; and A. P. Dempster, N. M. Laird, and D. B. Rubin, "Maximum Likelihood from Incomplete Data via the EM algorithm". Journal of the Royal statistical Society, Series B, 39(1): 1-38, 1977).

There are various approaches to solving the optimization problem of determining (locally) optimal values of the parameters given the data. The iterative refinement approaches are the most effective. The basic algorithm goes as follows:

1. Initialize the model parameters, producing a current model.

2. Decide memberships of the data items to clusters, assuming that the current model is correct.

3. Re-estimate the parameters of the current model assuming that the data memberships obtained in 2 are correct, producing a new model.

4. If the current model and the new model are sufficiently close to each other, terminate, else go to 2. In this step 'close' is evaluated by a predefined one of multiple possible stopping criteria.

The most popular clustering algorithms in the pattern recognition and statistics literature belong to the above iterative refinement family: the K-Means algorithm. See E. Forgy, "Cluster analysis of multivariate data: Efficiency vs. interpretability of classifications", Biometrics 21:768. 1965 or J. MacQueen, "Some methods for classification and analysis of multivariate observations." In *Proceedings of the Fifth Berkeley Symposium on Mathematical Statistics and Probability*. Volume I, Statistics, L. M. Le Cam and J. Neyman (Eds.). University of California Press, 1967.

There are other variants of clustering procedures that iteratively refine a model by rescanning the data many times. The difference between the EM and K-Means is the membership decision (step 2). In K-Means, a data item belongs to a single cluster, while in EM each data item is assumed to belong to every cluster but with a different probability. This of course affects the update step (3) of the algorithm. In K-Means each cluster is updated based strictly on its membership. In EM each cluster is updated by contributions from the entire data set according to the relative probability of membership of each data record in the various clusters.

Data records stored in a database typically contain a number of attributes that relate to different characteristics of a common observation or occurrence. Often the attributes for a given collection of data records are a mixture of discrete and continuous data fields. Discrete data attributes refers to instances wherein the values of a particular field in the database are finite and not ordered. For instance, color is a discrete feature having possible values {green, blue, red, white, black} and it makes no sense to impose an ordering on these values (i.e. green>blue?). Continuous attributes are fields of a data record that can be ordered, summed, averaged etc. Age is an example of such an attribute. A census database of records for individuals would typically contain a mixture of discrete and continuous data attributes.

SUMMARY

The disclosed system and method concern a generalized clustering process for use in clustering data having both continuous and discrete attributes. The clustering is done in phases. A first phase of the clustering process is to segment the records based on their discrete attribute values. The term configuration is used to refer to a set of values for each discrete attribute of the records. The configurations are ranked by their frequency. Frequency refers to the number of cases or records which have the discrete attribute values corresponding to the associated configuration.

In this first phase the number of configurations discovered may be very large. If this is the case, configurations with low frequency are merged with similar configurations having greater frequency. The result from this first phase is an identification of distinct segments over the discrete attribute space of the database.

A goal of the second phase is to identify cluster structure in the space of the continuous attributes, over the data belonging to each of the distinct configurations identified in the first phase. Many clustering techniques originating from the statistics, machine learning, and data mining communities compute satisfactory solutions over continuous-valued data. After the first phase has identified cluster structure over the discrete-valued attributes, any one of a number of clustering algorithms can be used for clustering the continuous attributes. This clustering is performed to segment data records within distinct configurations found in the first phase. The result is a segmentation over both the discrete and continuous parts of the data space.

After completion of the second phase, there may be a large number of resulting clusters. "Similar" clusters may be merged using a hierarchical agglomerative scheme while the resulting merged clusters are still "similar". This cluster reduction process may be performed until a specified number of clusters (perhaps provided by the data analyst) have been identified. The result is a clustering model having a number of clusters that characterize the database and summarize the data in a data structure that is much smaller (orders of magnitude) than the size of the entire database.

In accordance with the disclosed implementation a computer data processing system clusters data in a database. The database has a number of data records having both discrete and continuous attributes. Data records are grouped together acccording to their discrete attribute configuration. Data records having the same or a similar discrete attribute configuration are then clustered based on their continuous attributes to produce an intermediate set of data clusters over both the discrete and continuous parts of the data space. These intermediate clusters are then merged together to produce a clustering model.

These and other objects, advantages and features of an exemplary embodiment are described in conjunction with the accompanying drawings.

DETAILED DESCRIPTION

Figure 1:
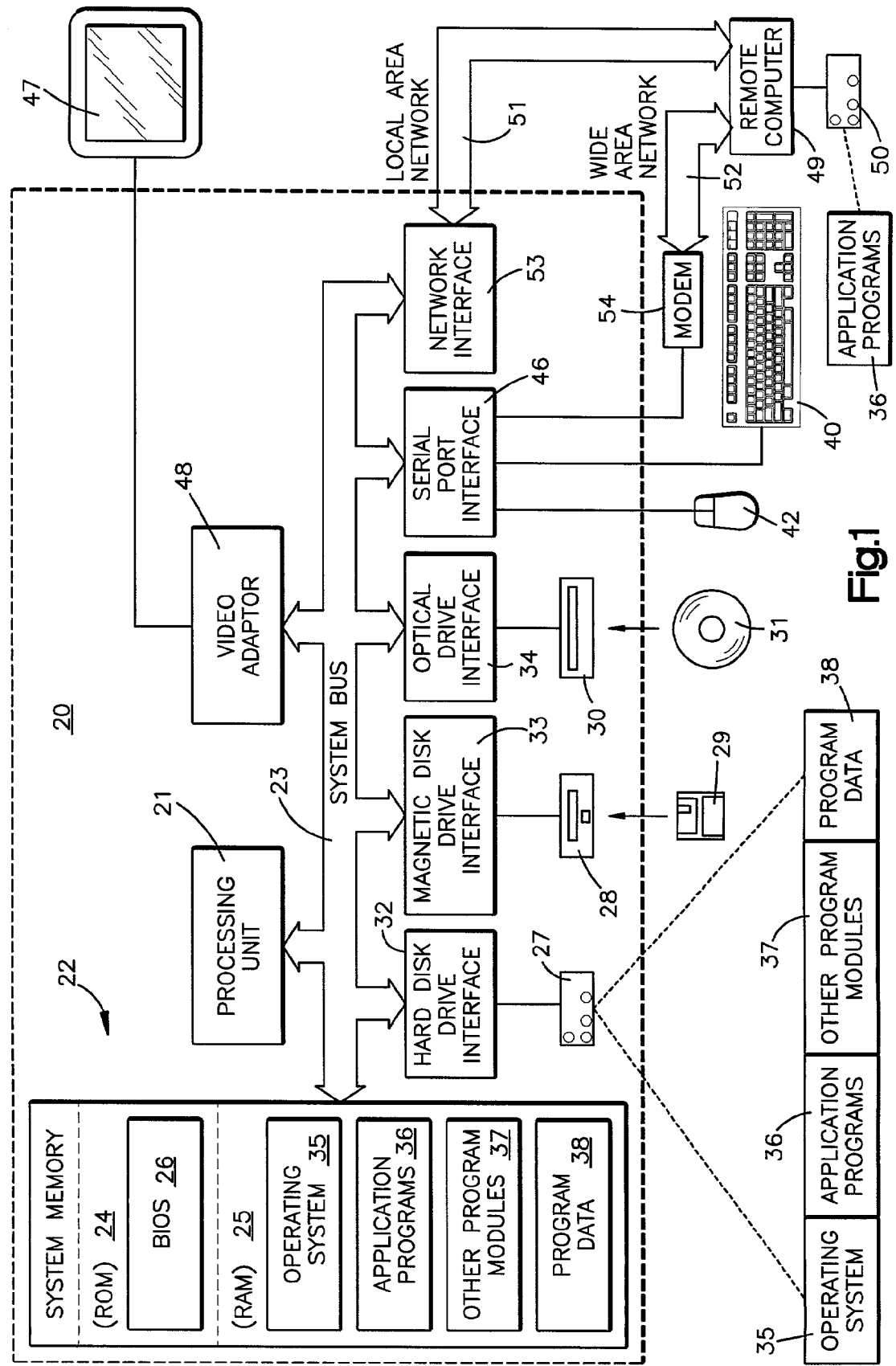
FIG. 1 is a schematic depiction of a computer system used in practicing an exemplary embodiment of the present invention.
Figure 2:
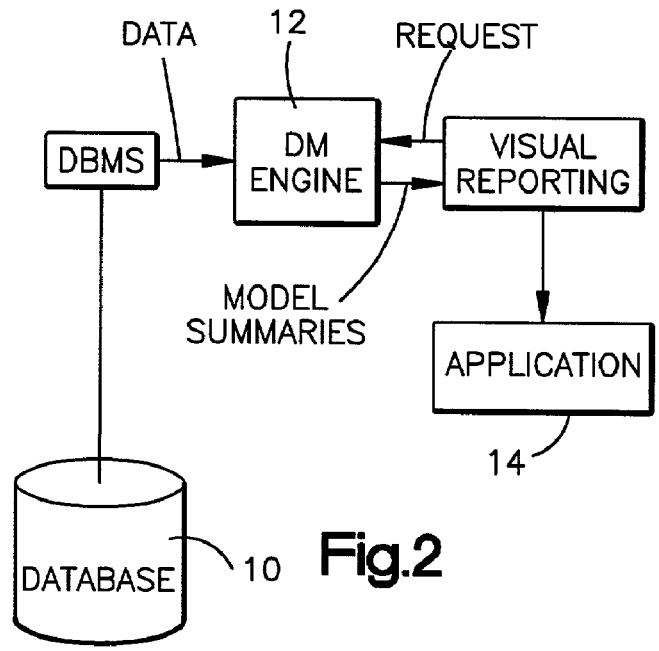
FIG. 2 is a schematic depiction of a database and a data mining software component for clustering of data within the database.

The exemplary embodiment of the invention is implemented by software executing instructions on a general purpose computer 20. A schematic of a representative computer is shown in FIG. 1. FIG. 2 depicts components for performing data clustering which include a data mining engine 12. In addition to clustering the data the data mining engine may also perform other analysis on data in the database 10. The data mining engine 12 clusters data records stored on a database 10 made up of data records having multiple attributes or fields that contain both discrete and continuous data. Depending on the number of data records and the size of those records, the database 10 is stored on a single fixed disk storage device or alternately can be stored on multiple distributed storage devices that may be accessed by the computer 20 over a network. The present invention concerns method and apparatus for determining a model 15 (FIG. 3) stored in a rapid access memory of the computer 20. The model 15 includes a set of attribute/value probabilities for the enumerated discrete data fields and a mean and covariance matrix for the ordered data fields.

In a client/server implementation of the invention an application program 14 acts as the client and the data mining engine 12 acts as the server. The application program 14 receives an output model 15 (FIG. 3) and makes use of that model in one of many possible ways mentioned above such as marketing studies and fraud detection etc. Published PCT patent application WO 99/62007 entitled "A Scalable System for Clustering of Large Databases having Mixed Data Attributes" to Fayyad et al discloses a clustering process for discrete and continuous data and is incorporated herein by reference.

Example Data Records

Consider four database records (Table 1) having six data fields. These records could be used, for example, by people making marketing evaluations of past trends for use in predicting future behavior. The data records describe purchases of groceries by different customers. While only four data records are depicted for purposes of explanation, a typical database will have many thousands if not millions of such records.

TABLE 1

| CaseID | Age | Salary | Bread? | Cheese? | Potatoes? | Milk? |
|--------|-----|--------|--------|---------|-----------|-------|
| 1 | 24 | 3000 | 1 | 0 | 1 | 0 |
| 2 | 30 | 5000 | 0 | 1 | 1 | 1 |
| 3 | 33 | 5200 | 0 | 0 | 0 | 1 |
| 4 | 45 | 6000 | 1 | 0 | 1 | 1 |

The two continuous data attributes of records from Table 1 are 'Age' and 'Salary'. The remaining attributes are discrete attributes and indicate a one or zero depending on whether a purchase of the item listed in the heading occurred. As an example, a customer identified with CaseID #2 who is thirty years old and has a monthly salary of $5000 purchased Cheese, Potatoes, and Milk but did not buy Bread. The invention could be used on a database having a small number of attributes but typically the invention will be used to cluster databases having many more continuous and discrete attributes than are shown in Table 1.

Mixed Data Clustering Model

Figure 3:
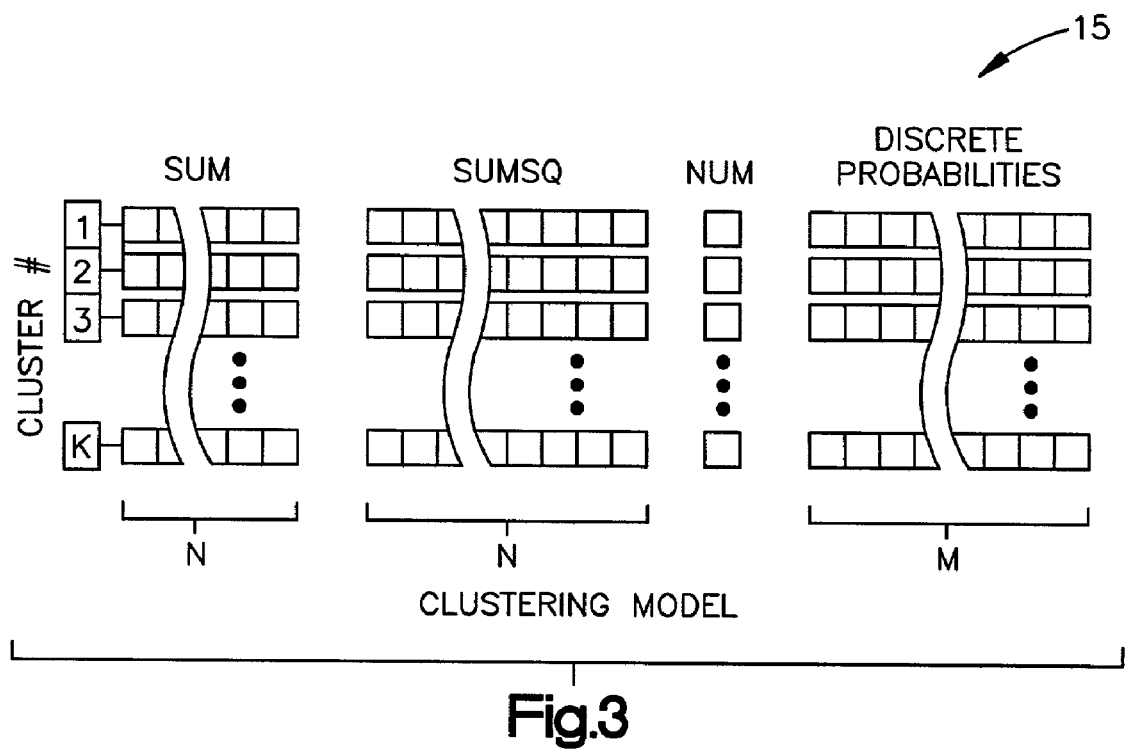
FIG. 3 is a data structure for characterizing data clusters from data stored in the database.

For each of the clusters being modeled, one can assign a Gaussian (having a mean and covariance matrix) to the age and salary attributes and probabilities (ranging from 0.0 to 1.0) for the discrete attributes. A data structure representing such a clustering model is depicted in FIG. 3 which shows K clusters and the associated data found by the data mining engine 12 for each cluster. The published WPO application contains a similar model data structure in FIG. 8D of that published application.

The vector 'SUM' represents the sum of the weighted contributions of each of the N continuous database record attributes. A second vector 'SUMSQ' is the sum of the squared components of each record over the continuous database attributes. These two values are vectors of floating point numbers. This vector component allows computation of the diagonal elements of the covariance matrix. In a general case the SUMSQ vector could be a full N×N correlation matrix. It is assumed that the off diagonal elements are zero. Calculation of the diagonal covariance matrix "CVMatrix" is described in the published WPO application to Fayyad et al. A third component of the model of FIG. 3 is a NUM value which is a floating point number corresponding to the number of records that make up a cluster and could alternately be expressed as an integer. SUM and SUMSQ are vectors of floating point numbers. Finally a table of values for the discrete attributes are real numbers between 0.0 and 1.0 corresponding to a probability that a given attribute is 1. Covariance is defined from model data (FIG. 3) for a given cluster and a given attribute by the relation:

$$\text{Covariance} = \frac{SumSq}{NUM} - \frac{Sum * Sum}{NUM^2}$$

In accordance with the present invention, the clustering model 15 is arrived at in two phases. A cluster structure over the discrete attribute space is first performed using methods similar to methods for identifying frequent itemsets in data. Known frequent itemset identification algorithms are efficient in dealing with 1000-100,000s of attributes. The present invention uses similar methods to locate discrete attribute cluster structure. Once this cluster structure is determined, structure over the continuous attributes of data is identified using one of the many methods currently available for clustering continuous attribute data.

Consider a row r from a database D such as a row depicted in the set of records of Table 1. Each row consists of a continuous part (Age, Salary) and a discrete part (Bread?, Cheese?, Potatoes? Milk?): A row, $r=[x,c]$ with $x \in R^N$ and $c \in [0,1]^M$. N is the number of continuous attributes, which is for all rows the same. M is the number of discrete attributes, which is for also the same for all rows. That is $D=\{[x,c]: x \in R^N \text{ and } c \in [0,1]^M\}$. For $r=[x,c]$ x is the continuous part and c is the discrete part which is also called the configuration for the record. Furthermore, we call c the configuration.

More generally, for the case when a discrete attribute has more than 2 possible states, it is possible to equivalently transform this single discrete attribute into a number of attributes, each with 2 states. For example, consider the attribute "Hair Color" which could have 1 of 4 possible values: "Red", "Brown", "Black", "Blonde". It is possible to equivalently transform this to 4 attributes, each taking a value of "0" or "1". The new attributes are: "Hair Color=Red", "Hair Color=Brown", "Hair Color=Black", "Hair Color=Blonde". If the original "Hair Color" attribute had value "Brown", then the transformed attributes have values: "Hair Color=Red"=0, "Hair Color=Brown"=1, "Hair Color=Black"=0, "Hair Color=Blonde"=0. Given this transformation, the present clustering system is applicable to discrete-valued attributes with more than 2 possible states.

Configurations

As a notational convention, refer to the set of all configurations as Conf. For each $x=[x_1, \ldots x_N]$, in the record, each $x_i$ in the N dimension vector represents a continuous attribute and for each $c=[c_i, \ldots, C_M]$ each $c_i$ in the set of M bits represents a discrete (binary) attribute $A_i$. Configurations represent different discrete attribute combinations so that if there are M different attributes and each attribute is binary (0 or 1) there are $2^M$ different combinations or configurations.

For each database D we can indicate the set of all configurations occurring in D: $\text{Conf}(D):=\{CF=c: x \in R^N, c \in [0,1]^M \text{ and } [x,c] \in D\}$. For each configuration CF, define the support as $\sup(CF)=|\{r: x \in R^N \text{ and } r=[x,c] \in D, CF=c\}|$, that is the number of records having that unique discrete attribute configuration regardless of the contents of the continuous attributes.

One observation is that the size of Conf(D) differs very much for different databases. For some databases Conf(D) is very large and when this is so there may be many configurations CF having small support of only a few data records.

In accordance with the invention, the database is partitioned by determining a partition $\text{PartConf}=\{P_1, \ldots, P_L\}$ based on the original configurations Conf(D). $P_1 \cup \ldots \cup P_L = \text{Conf}(D)$ and $P_i \cap P_j = \emptyset$ for $i \neq j$ such that the configurations within each $P_i$ are similar to each other and configurations in two different sets $P_i$ and $P_j$ are not similar and the support of $P_i$ is large enough, where $\sup(P_i) = \sup(CF_1) + \ldots + \sup(CF_n)$, $P_i = \{CF_1, \ldots, CF_n\}$. That is, one determines all the configurations of the database and then combines sets of configurations that are similar.

The process of the invention defines for each $P_i \in \text{PartConf}$ a vector of probabilities: $\text{prob}(P_i)=[p(A_1|P_i), \ldots, p(A_M|P_i)] = [\text{count}(A_1|P_i)/\sup(P_i), \ldots, \text{count}(A_M|P_i)/\sup(P_i)]$, where $\text{count}(A_j|P_i)$, $j=1, \ldots, M$, $i=1, \ldots, L$ (L is the number of partitions) is the number of rows $r=[x,c]$ with $A_j=c_j=1$ and $c \in P_i$. Recall that $c=[c_1, \ldots, c_M]$ are a set of M bits of ones or zeros. Formally $\text{count}(A_j|P_i)=c^1_j \cdot \sup(c^1) + \ldots + c^n_j \cdot \sup(c^n)$ and we assume that $P_i = \{c^1, \ldots, c^n\}$. Note that the upper index marks the configurations in $P_i$ and the lower index marks the attribute, that is $c^1_j = 0$ or 1. The probabilities describe the occurrences of 1 in each attribute for a given partition. A goal is to get values near 1 or values near 0 to have a good separation between two different partitions $P_i$ and $P_j$.

Each configuration CF can be represented as set of natural numbers representing the bits set: $\text{bits}(c)=\{j: c_j=1\}$. One can represent, for example, the configuration 1010 from Table 1 wherein the customer bought Bread and Potatoes but not Cheese and not Milk (see CaseID=1) by the bit set $\{1,3\}$.

Figure 4:
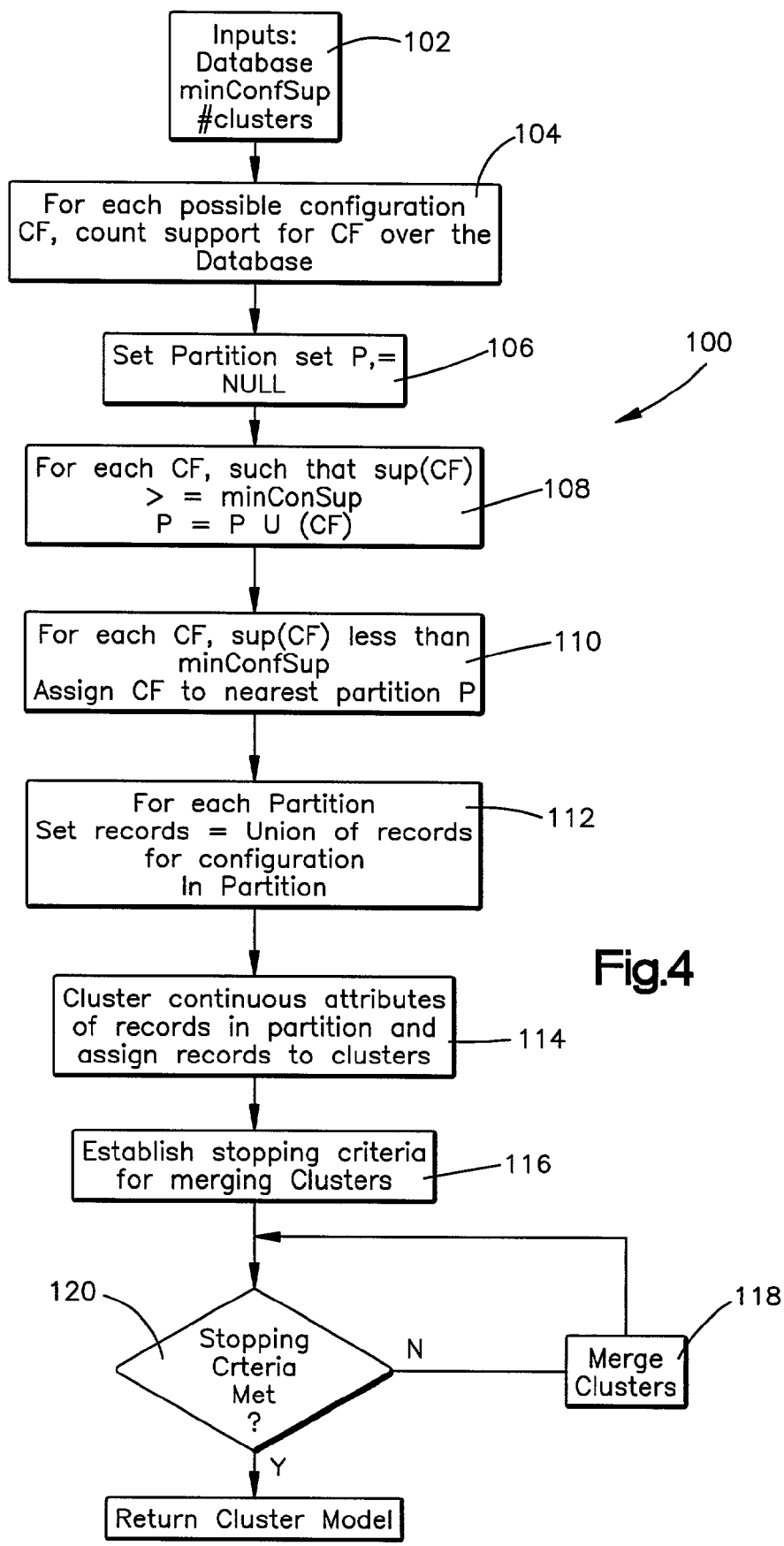
FIG. 4 is a flow chart depicting steps of a clustering of data in a database in accordance with the invention.

FIG. 4 is a flow chart 100 shows processing steps for practicing the present invention. Inputs 102 to the process are the database 10 and a parameter designated as 'minConfSup' and an optional number of clusters K. The 'minConfSup' parameter is the number of instances of a particular configuration $Cf_i$ one needs to find in order to use this configuration as a starting point for determining a discrete attribute cluster.

Finding Partitions

All configurations, both those above and those below the threshold, minConfSup can be represented as a bit pattern. In order to identify those configurations having size above minConfSup, the process of FIG. 4 includes a step 104 of counting all instances of each configuration $Cf_i$ and tabulating the result. A next step is to initialize 106 a set of partitions to an empty set. At a next step 108 the set of initial partitions is set equal to the set of configurations wherein support for the configuration exceeds the minConfSup threshold. At this stage of the FIG. 4 process, the set of partitions does not include all configurations since those configurations having support less than the threshold minConfSup are not included in the partitions set up in the step 108.

Merging Configurations into Partitions

One criteria for combining or merging sets of configurations not having the minConfSup threshold is similarity. Those configurations that are sufficiently similar to already existing partitions can be merged into the existing partition. To get a value for the similarity between two configurations $CF_1$ and $CF_2$ one develops a distance metric between the two configurations. Similarly, to get an idea of the similarity between a partition and a configuration one can determine a distance metric between the partition and the configuration having a support below the threshold minConfSup. The process 100 then assigns 110 the configuration to its nearest neighbor partition. Two possible options are presented.

Option 1—In a first option for determining a distance metric one sorts the configurations lacking 'minConfSup' according to their support from highest to lowest support. One then examines the partitions $P_i$ in order, starting from the one with greatest support and continuing to low support, to find the nearest partition to each configuration that lacks sufficient support. The partition is characterized by a sequence of bits (0's and 1's). Each of the configurations lacking support has a nearest neighbor. These nearest neighbors are determined and the data from these configurations is combined into the partition after all configurations having support falling below the minConfSup threshold are examined. Once this is done the partition and configurations associated with that partition are combined or merged 112 to produce a probability table for that partition.

A distance metric for Option 1 is based on a Hamming distance. Let $P^i$ be an existing partition and let CF be a configuration not having support to form a partition, i.e. minConfSup is greater than the support of the configuration CF.

Then the distance, D is given by:

$$D(P^i, CF) = \sum_{j=1}^{M} |P^i_j - CF_j|.$$

This metric sums those instances where the partition and the configuration differ for each attribute (i.e. counts the number of bits where $P^i$ and CF differ). The smaller the number the more similar the partition and configuration are and hence the distance is less. This test can be performed for each configuration CF and a closest partition determined for those configurations not have the support of size minConfSup.

Consider an example from Table 1. Assume that the discrete attributes corresponding to CaseId #1 occurs often enough to exceed the minConfSup threshold but that CaseId #4 does not occur with sufficient frequency. The bit pattern 1010 (CaseId #1) therefore forms a basis for a partition but the support for the configuration 1011 (CaseId #4) is less than minConfSup. Under these circumstances, one calculates the distance between the partition P(1010) and the configuration CF(1011) according to the fomula as 0+0+0+1=1. Depending on the relation between the configuration CF(1011) and other partitions this may lead to a merging of this configuration into the partition P(1010).

In accordance with this first option the merging is performed after a nearest partition neighbor for all configurations having less than minConfSup has been identified. Identifying the support for all existing configurations is performed during one scan of the database. One process creates a list of all data records for each configuration as it is encountered during the scan of the database 10. From this list one knows the number of data records for each configuration that make up a partition as well as the number of records in configurations that lack support. When configurations lacking support are merged into a partition, the bit patterns of discrete attributes become tables of probabilities and the records in the merged partition are made up of records from the list of low support partitions with records for the partition into which the low partition records are merged. An example of such a table of probabilities is given below in the discussion of option 2.

Option 2—A second option for determining distance is based on probabilities between a configuration not having sufficient support and the partitions. In this option the configurations are merged into the partitions as the configurations are evaluated. This means that once at least one configuration is merged with a partition, then the partition is a table of probabilites and not discrete ones and zeros. Consider the case of CaseId #1 and CaseId#4 from above. If the configuration(1011) is merged to the partition P(1010) and there were 900 records having the configuration 1010 and 100 records having configuration 1011, then the probability table for the combined partition for all 1000 records would be a probability table:

TABLE 2

| Partition(1010) | Bread? | Cheese? | Potatoes? | Milk? |
|---|---|---|---|---|
| | 1.0 | 0.0 | 1.0 | 0.1 |

The first three discrete attributes for the 1000 records are the same and the last attribute (Milk?) has 900 records with a 0 bit and 100 records with a 1 bit. The result is a probability for this attribute of 0.1.

The criteria for merging 110 sets of configurations into partitions for the second option is obtains probabilities near 1 or near 0 for each attribute of the partition's probability table. The following formula is used as a distance metric:

$$D(P^i, CF) = 1 - \prod_{j=1}^{M} \begin{cases} (p_j^i), & CF_j = 1 \\ (1 - p_j^i), & CF_j = 0 \end{cases}$$

This formula gives the distance between a configuration of low support and a partition. The smaller the number the more similar the partition and configuration are and hence the distance is less. Returning to the example of above where the support for the partition P(1010) is 900 records and only 100 records have the configuration CF(1011). Assume that other partitions have been merged into the partition P(1010) so that the probabilities for the four discrete attributes are Bread?=0.94, Cheese?=0.10, Potatoes?=0.89, and Milk?=0.05. From the formula above one has D[(P(1010), CF(1011)]=1−[(0.94)*(1.0−0.1)*(0.89)(0.05)]=1−0.037.

Optional Merging of Partitions

After all configurations having a support less than the minConfSup threshold have been added to a partition, it may be desirable to merge partitions. This merging is also based on a similarity between partitions. Two partitions can be characterized as tables of probabilities and the number of records NUM that make up a partition. $P^i=[p1^i, p2^i, \ldots, pM^i]$, $NUM^i$ and $P^h=[p1^h, p2^h, \ldots pM^h]$, $NUM^h$ One simple distance metric between partitions is:

$$D(P^i, P^h) = \sum_{j=1}^{M} |P_j^i - P_j^h|,$$

This metric only compares probabilities and does not take into account the number of Records in a partition. A second formula that is more complex but which may under certain circumstances be more appropriate is:

$$D(P^i, P^h) = 1/2\left[1 - \prod_{j=1}^{M} (P_j^i)^{NUM^h P_j^h}(1 - P_j^i)^{NUM^h(1-P_j^h)}\right] + 1/2\left[1 - \prod_{j=1}^{M} (P_j^h)^{NUM^h P_j^h}(1 - P_j^h)^{NUM^i(1-P_j^i)}\right]$$

The distances calculated using these metrics are compared for pairs of partitions for all remaining partitions. When the closest two partitions are found they are merged. The merge process combines the probabilities of the partitions and the number NUM of records that make up a partition. The newly merged partition is then used to evaluate further merging of partitions until a final number of partitions is reached. The process of merging partitions is a hierarchical agglomerative clustering process. Determination of the minimum support threshold minConfSup and the number of Partitions to retain may be functions of memory of the computer performing the calculations. Generally the larger the number of configurations retained, the more information about the database is retained in the clustering model so that if large amounts of memory are made available for the clustering process, the minConfSup and number of partitions should be chosen to maintain a relatively large number of partitions.

Continuous Attribute Clustering

The next phase of the clustering procedure of FIG. 4 is a clustering 114 of the continuous attributes of the data records in the database. To do this, one must have a means of determining all data records of the database for each of the partitions found above. One manner of keeping track of these records is to maintain a list or an array of records by record ID as the steps of finding the partitions are performed. When a partition is finalized, all records that contribute to that partition are known from the list or array. A second process that uses less memory is to scan the database once the probability tables for the partitions are known and assign records to the closest partition. This is less demanding on memory utilization but slows the clustering process. Both options produce a list of records for each Partition $P_i$ where each of the records has a continuous set of attributes which must now be clustered. One such partition from a shopping cart database example is depicted below as table 3.

TABLE 3

| Record ID | Age | Salary | Partition |
|---|---|---|---|
| 001 | 51 | 3000 | P1 |
| 002 | 27 | 3200 | P1 |
| 003 | 38 | 3700 | P1 |
| ... | ... | ... | P1 |
| 1001 | 37 | 2700 | P1 |
| ... | | | |

Note in table 3 only the continuous attributes are listed since the discrete attributes are now represented by a table of probabilities for each of the discrete attributes of a record and stored with the partition P1 description. For each set of configurations that make up a partition $P_i$, the process yields a table of records in the continuous space: $Cont(P_i)=\{x: x \in R^N, c \in [0,1]^M, r=[x,c] \in D \text{ and } c \in Pi\}$ where $i=1, \ldots, L$, where L is the number of partitions.

One implementation of the invention uses a well known algorithm, the Expectation Maximization Algorithm (EM), to find continuous clusters in $Cont(P_i)$. The number of clusters we search can vary with the size of Cont(Pi). The size of the partitions $P_i$ should satisfy two criteria: It should large enough to find clusters, but small enough to find clusters in a reasonable time. Alternate clustering schemes could use the K-means clustering process or could use a hierarchical agglomerative clustering scheme where records are combined together until a set of clusters is obtained based on a distance metric between records.

Assume EM clustering is used. The process 100 describes the clusters found by the EM clustering step 114 with a mean $\mu$, a covariance matrix cov and the number of records contained in a cluster NUM. Note that cov is a vector because the process uses only diagonal covariance matrices.

Now denote the clusters in $Cont(P_i)$ as $PC_{i1}, \ldots, PC_{iKi}$ where $PC_{ij}=[\mu_{ij}, cov_{ij}, count_{ij}]$ where $K_i$ is the number of clusters found by EM for the $i^{th}$ partition ($P_i$). Note $i=1, \ldots, L$, and $j=1, \ldots, K_i$. Note, the process could fix the number of clusters for all partitions and the subscript (i) would be removed form the K designation i.e. there would be a fixed number of clusters K for each partition. The number of clusters can also vary depending on how many records are contained within the partition.

One process next assigns (harshly) each record from $Cont(P_i)$ to one of the clusters $PC_{i1}, \ldots, PC_{iKi}$. That subdivides the records from the starting partition $Cont(P_i)$. The points assigned to a cluster $PC_{ij}$ may have different configurations from $P_i$. Let us denote the set of these configurations as conf($PC_{ij}$). Note: Not every configuration in $P_i$ must be contained in each set conf($PC_{ij}$). For every set conf($PC_{ij}$) we define a vector prob(conf($PC_{ij}$)) which gives the probability for each discrete attribute in the cluster $PC_{ij}$.

Example:

$P_i$={1110,1111}

Cont($P_i$)={[3.5,4.1] and similar values, [1.0,0.0] and similar values}

Hence we get: $PC_1$=[3.5,4.1]$PC_2$=[1.0,0.0]

But 1110 occurs only with [3.5,4.1] and 1111 only with [1.0,2.0]

Hence we get prob(conf($PC_1$))=[1.0,1.0,1.0,0.0] and Prob(conf($PC_2$))=[1.0,1.0,1.0,1.0]

As described in the literature, the Expectation Maximization clustering assigned a probability of the continuous attributes to different clusters with different weights. Rather than harshly assign each record to a specific cluster the records can be partially assigned to all the clusters. This means that when the probability vector for a given cluster is determined each of the records falling within the partition (P) will contribute to the clusters of that partition, both the continuous mean and co-variance and the probabilities for the discrete attributes.

Merging Clusters

The clustering process thus far yields a large number of indivisible, small clusters characterized by a pair [discrete cluster, continuous cluster]. Denote these pairs as $W_{ij}$=[prob (conf($PC_{ij}$)), $PC_{ij}$], i=1, . . . , L (L=number of partitions) and j=1, . . . , $K_i$. Denote the absolute value of $W_{ii}$ as |$W_{ij}$| to mean the number of points in this cluster: |$W_{ij}$|:=$count_{ij}$. We define W={$W_{ij}$:i=1, . . . , L, j=1, . . . , $K_i$} to mean the collection of all sets $W_{ij}$. These are the 'small' clusters that we seek to combine into so called super clusters.

The number of pairs [discrete cluster, continuous cluster] for a database having thousands of records is typically high. A next goal is to find a partition V={$V_1$, . . . , $V_s$} of W, such that every $V_k$ forms a good super-cluster containing the sub-clusters $W_{ij}$. With |$V_j$| we denote the number of points in $$V_j \cdot |V_j| = \sum_{W_{ab} \in V_j} |W_{ab}|.$$

The invention employs different ways to merge the large number of pairs $W_{ij}$ to get a smaller, user-friendly number of clusters that define the final clustering model such as the model 15 depicted in FIG. 3. All implementations use a hierarchical clustering algorithm to merge 'close' clusters into a super cluster. A stopping criteria is chosen 116 and one stopping critera ends the merging process when the number of super clusters reaches a user defined target cluster number. Two others use a threshold on distance between super clusters to end the clustering so that no two subclusters $W_{ii}$ that are joined together are more than a specified distance apart.

The process begins with the number of 'small' clusters |$W_{ij}$| and produces a new set of superclusters represented with the notation $V_k$. The process searches for two good candidates to merge, merges 118 them and iterates until a stopping criteria is met 120. This critera is satisfied when either a specified cluster number K is reached or until a specified distance stopping criteria is satisfied.

To help define the different merging processes it is helpful to introduces notations for use in defining distance or similarity between clusters. Let dist_cont be the distance between the continuous part of a cluster and let dist_disc be the distance between the discrete attribute portion of the cluster.

For a particular attribute, the distance between two continuous cluster attributes is given by:

$dist_c$(x,y)=|x−y|/4σ, where sigma is the standard deviation of all the records in the database for the continuous attribute. Note this value can be determined by means of a simple SQL query of the database. The resulting distances will most likely be a value between zero and one. Taking into account all N attributes one has:

$$dist_c(PC_{ab}, PC_{cd}) = \frac{1}{N}\left[\sum_{j=1}^{N} dist_c(\mu_{ab}^j, \mu_{cd}^j)\right]$$

Here, μ is the mean of the cluster with index ab. Distance between two discrete cluster attributes is:

dist_d(conf($PC_{ab}$),conf($PC_{cd}$))=|prob(conf($PC_{ab}$))−prob (conf($PC_{cd}$))|. One then must take into account all the M attributes that are discrete:

$$dist\_d\,(PC_{ab}, PC_{cd}) =$$

$$\frac{1}{M}[\sum_{j=1}^{M} dist\_d\,(prob(conf(PC_{ab}))_j, prob(conf(PC_{cd}))_j],$$

Note: j refers to the components of the vector prob(conf ( . . . )). Alternatively one can use the metric:

$$dist\_d\ (prob(conf(PC_{ab})), prob(conf(PC_{cd}))) = \sum_{i=1}^{M} p_i(1-p_i)$$

where the summation is over the attributes and p is the vector of probabilities for the discrete attribute if we merge conf($PC_{ab}$) and conf($PC_{cd}$). In all cases distance values near 0 mean high similarity.

To find the distance between two clusters one averages the distances between the discrete and the continuous attributes. If one wanted to weight certain attributes more heavily than others in the clustering process one could assign weights to certain attributes. Also if one wanted to assign more weight to the discrete or the continuous attributes a weighting of one or the other set of attributes could be made.

Now one can compute continuous and discrete distances between super-clusters:

$$dist\_c(V_i, V_j) = \frac{1}{|V_i||V_j|} \sum_{W_{ab} \in V_i} \sum_{W_{cd} \in V_j} |W_{ab}||W_{cd}| dist\_c(PC_{ab}, PC_{cd})$$

$$dist\_d(V_i, V_j) = \frac{1}{|V_i||V_j|} \sum_{W_{ab} \in V_i} \sum_{W_{cd} \in V_j} |W_{ab}||W_{cd}| dist\_d\,(conf(PC_{ab}), conf(PC_{cd})).$$

There are two stopping criteria for the merging: 1) Merging until we get a certain number of clusters—K—given by user. 2) Merging until the distances are larger then a threshold—maxMergeThreshold—supplied by a user.

A first merging algorithm uses an aggregation function to compute the distance d between two super-clusters: $d(V_i, V_j)$=agg(dist_c($V_i,V_j$),dist_d($V_i,V_j$)) where agg is the aggregation function. Useful aggregation functions are max(dist_c($V_i,V_j$),dist_d($V_i,V_j$)) or (1+dist_d($V_i,V_j$))·dist_c($V_i,V_j$) for instance. The task now is to find two super-clusters $V_k$ and $V_l$ with the minimum distance and to merge them.

1. V={{$W_{ij}$}:i=1, . . . , L and j=1, . . . , $K_i$}
2. find k, l with $V_k$, $V_l \epsilon V$ such that $d(V_k,V_l)$=min{$d(V_i, V_j)$:$V_i,V_j \epsilon V$ }
3. if $d(V_k,V_l)$>maxMerge Threshold then stop
4. $V_i=V_i \cup V_j$
5. V=V\\$V_j$
6. if |V|=K then stop else goto 2

A second solution to merge super-clusters avoids the use of an aggregation function. This is an advantage, because in many cases it is time consuming and difficult to find correct weights for discrete and continuous distances and to connect both of them with an aggregation function. The main idea of the second solution is: If the distance between super-clusters in the continuous part is small enough, then we compute the distance in the discrete part. If the distance in the discrete part is less than max merge threshold, then merge the super-clusters.

1. V={{$W_{ij}$}:i=1, . . . , L and j=1, . . . , $K_i$}
2. find k, l with $V_k$, $V_l \epsilon V$ such that dist_d($V_k,V_l$)= min{dis_d($V_i,V_j$):$V_i$, $V_j \epsilon V$ and dist_c_($V_i,V_j$)<=max-DistCont} and maxDistCont=$T_2$*min{d_cont($V_i,V_j$): $V_i$, $V_j \epsilon V$}}
3. if dist_d($V_k,V_l$)>max merge threshold then stop
4. $V_i=V_i \cup V_j$
5. V=V\\$V_j$
6. if |V|=K then stop else goto 2

$T_2$ is a parameter to limit the set where we search for the minimal discrete distance, to ensure that the continuous distances do not differ very much. $T_2$=1.1 . . . 1.3 have been found to be suitable working values.

A merging of two clusters into a super cluster is performed in different ways depending on how the data is tracked during the evaluation. Under certain circumstances all records for a cluster are known so that when two clusters are merged the SUM, SUMSQ, NUM and probability tables of the model 15 are calculated quite easily by using the data from the list of records that make up the two clusters to be combined. For large databases this list of records may not be maintainable. Under these circumstances the so called sufficient statistics for the two clusters are used to find the SUM, SUMSQ, NUM, and probability tables of combined cluster. Prior to merging two clusters one has a separate entry in a data structure such as the data structure of FIG. 3 for each of the two clusters.

Published WPO application no. WO 99/62007 to Fayyad et al includes a flow chart at FIGS. 7A and 7B that explains an updating of an existing cluster model from FIG. 8D with the sufficient statistics stored in data structures depicted in FIGS. 8A-8C. In particular, it is seen that the so called CS subclusters from the data structure of FIG. 8B are merged with so called discard data DS in the data structure of FIG. 8A to form a new model for the FIG. 8D datastructure. The sufficient statistics of these two data structures DS, CS are combined in a way that takes into account the number of records in an existing subcluster as well as the data summarized in the DS data structure. This is true for both the continuous attribute SUM, SUMSQ data as well as the discrete attribute probability tables.

A similar process is performed for the present invention wherein two clusters are merged. The sufficient statistics, SUM, SUMSQ (reals in EM clustering) for continuous attributes, NUM for the cluster, and probabilities for discrete attributes are combined into a single set of sufficient statistics. Briefly, the SUM and SUMSQ data for each attribute is added together, the NUM data is added together and the probabilites are recalculated based on the NUM for each of the two clusters and the probability value for that attribute.

COMPUTER SYSTEM

With reference to FIG. 1 an exemplary data processing system for practicing the disclosed data mining engine invention includes a general purpose computing device in the form of a conventional computer 20, including one or more processing units 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read only memory (ROM) 24 and random access memory (RAM) 25. A basic input/output system 26 (BIOS), containing the basic routines that helps to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

While the present invention has been described with a degree of particularity, it is the intent that the invention include all modifications and alterations from the disclosed implementations falling within the spirit or scope of the appended claims.

We claim:

1. A computer readable medium containing stored instructions for clustering data in a database comprising instructions for:
   a) reading records from a database having a number of data records having both discrete and continuous attributes;
   b) performing a first clustering of data records from the database which have specified discrete attribute configurations by itemset identification;
   c) performing a second clustering of the data records having the same or similar specified discrete attribute configuration based on the continuous attributes to produce an intermediate set of data clusters, wherein the first clustering precedes the second clustering; and
   d) merging together clusters from the intermediate set of data clusters to produce a clustering model,
   wherein the instructions identify configurations by tabulating data records having the same discrete attribute bit pattern and combining the data records from similar configurations before clustering the data records so tabulated based on the continuous attributes.

2. The computer readable medium of claim 1 wherein the instructions end the process of merging of intermediate clusters when a specified number of clusters has been formed.

3. The computer readable medium of claim 1 wherein the instructions end the process of merging intermediate clusters when a distance between intermediate clusters is greater than a specified minimum distance.

4. The computer readable medium of claim 1 wherein the discrete attributes are Boolean and the instructions determine similarity between configurations based on a distance between bit patterns of the discrete attributes.

5. In a computer data processing system, a method for clustering data in a database comprising:
   a) providing a database having a number of data records having both discrete and continuous attributes;
   b) grouping together data records in a clustering model from the database which have specified discrete attribute configurations;
   c) performing clustering of data records in two phases including a first phase and a second phase, the first phase clustering the data records over a discrete attribute space using an itemset identification, and the second phase clustering continuous attributes using a method for clustering continuous attribute data to produce an intermediate set of data clusters, wherein the first phase precedes the second phase; and
   d) merging together clusters from the intermediate set of data clusters to produce a clustering model,
   wherein the discrete attributes are Boolean and similarity between configurations is based on a distance between bit patterns of the discrete attributes, and
   wherein the step of identifying configurations includes tabulating data records having the same discrete attribute bit pattern and combining the data records from similar configurations before clustering the data records so tabulated based on the continuous attributes.

6. The method of claim 5 wherein the cluster model for continuous data attributes comprises a mean and a covariance for each cluster.

7. The method of claim 5 wherein the process of merging of intermediate clusters is ended when a specified number of clusters has been formed.

8. The method of claim 5 wherein the step of merging of intermediate clusters is ended when a distance between intermediate clusters is greater than a specified minimum distance.

9. The method of claim 5 wherein if one or more of the discrete attributes have more than two possible values then comprising the step of subdividing a discrete attribute having more than two possible values into multiple Boolean value attributes.

10. In a computer data processing system, a method for clustering data in a database comprising:

a) providing a database having a number of data records having both discrete and continuous attributes;
b) performing a first discrete cluster by itemset identification and identifying a first set of configurations wherein the number of data records of each configuration of said first set of configurations exceeds a threshold number of data records;
c) adding data records from the database not belonging to one of the first set of configurations with a configuration within said first set of configurations to produce a subset of records from the database belonging to configurations in the first set of configurations; and
d) performing a second continuous clustering of the subset of records contained within at least some of the first set of configurations based on the continuous data attributes of records contained within that first set of configurations to produce a clustering model,
wherein the clustering of records from records falling within a configuration of the first set results in a number of intermediate clusters which are merged together to form the cluster model,
wherein intermediate clusters are merged together based on a distance between clusters that is determined based on both continuous and discrete attributes of said intermediate clusters,
wherein the merging of intermediate clusters is performed until a distance between two closest clusters is greater than a threshold distance.

11. The method of claim 10 wherein the clustering model includes a table of probabilities for the discrete data attributes of the data records for a cluster and wherein the cluster model for continuous data attributes comprises a mean and a covariance for each cluster.

12. The method of claim 10 wherein an added record not contained within the first set of configurations is added to one of said first set of configurations based on a distance between a smaller configuration to which said added record belongs during counting of records in different configurations.

* * * * *